United States Patent
Rangari et al.

(10) Patent No.: US 9,792,150 B1
(45) Date of Patent: Oct. 17, 2017

(54) DETECTING SITE CHANGE FOR MIGRATED VIRTUAL MACHINES

(71) Applicant: Veritas Technologies LLC, Mountain View, CA (US)

(72) Inventors: Amit Haridas Rangari, Pune (IN); Udipta Das, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 211 days.

(21) Appl. No.: 13/930,752

(22) Filed: Jun. 28, 2013

(51) Int. Cl.
*G06F 9/48* (2006.01)
*G06F 9/455* (2006.01)

(52) U.S. Cl.
CPC ........ *G06F 9/4856* (2013.01); *G06F 9/45558* (2013.01); *G06F 2009/45575* (2013.01)

(58) Field of Classification Search
CPC ............... G06F 9/45558; G06F 9/4856; G06F 2009/4557; G06F 2009/45575
See application file for complete search history.

(56) References Cited

U.S. PATENT DOCUMENTS

| | | | |
|---|---|---|---|
| 2011/0225117 A1* | 9/2011 | Nakanishi | G06F 3/0605 707/602 |
| 2012/0180041 A1* | 7/2012 | Fletcher | G06F 9/45558 718/1 |
| 2012/0278571 A1* | 11/2012 | Fleming et al. | 711/162 |
| 2013/0007738 A1* | 1/2013 | McCloy | 718/1 |
| 2013/0304899 A1* | 11/2013 | Winkler | 709/224 |
| 2013/0305242 A1* | 11/2013 | Wang et al. | 718/1 |
| 2014/0157260 A1* | 6/2014 | Balani et al. | 718/1 |
| 2014/0196030 A1* | 7/2014 | Deshpande | G06F 9/45558 718/1 |

* cited by examiner

*Primary Examiner* — Lewis A Bullock, Jr.
*Assistant Examiner* — Jacob Dascomb
(74) *Attorney, Agent, or Firm* — Campbell Stephenson LLP (57) ABSTRACT

Various systems and methods for detecting a site change. For example, one method involves detecting migration of a virtual machine. The method also involves determining whether the virtual machine moved from one site to another site during the migration. The method also involves updating location information, where the location information is updated in response to determining whether the virtual machine moved from one site to another.

21 Claims, 8 Drawing Sheets

DETECTING SITE CHANGE FOR MIGRATED VIRTUAL MACHINES

FIELD OF THE INVENTION

This invention relates to data processing systems, and in particular, to managing virtual machines.

DESCRIPTION OF THE RELATED ART

Virtual machines can be used to extend the functional capabilities a physical host computing device provides. How effective the virtual machines are depends, to a large extent, on the configuration of the virtual machines, and the physical host(s) on which the virtual machines are implemented. Virtual machines are software constructs that can perform tasks typically associated with physical computing devices. Multiple virtual machines can be implemented on a single physical host, each virtual machine having its own operating system. Each virtual machine can operate independently of the other virtual machines.

Virtual machines can be used in clustered environments. A cluster typically includes interconnected processing systems (e.g., nodes) that share resources, such as storage space and data transmission bandwidth. Nodes in a cluster also provide failover redundancy such that if one node fails, the programs running on the failed node (e.g., one or more virtual machines) are failed over to another node in the cluster.

A virtual machine implemented in a cluster may be configured specifically for the cluster in which the virtual machine is implemented. For example, a virtual machine in a cluster may be configured to utilize a shared storage device associated with the cluster. Virtual machines may also be configured to fail over to a particular node in the cluster.

As cluster technology has advanced, additional capabilities and flexibility have caused an increase in the complexity of configuring clusters, and virtual machines within the clusters. For example, selecting host nodes on which to implement virtual machines can be based on numerous factors, including the types and capabilities of available nodes. Furthermore, when selecting a host node for a virtual machine, any dependencies that the virtual machine may have, e.g., with applications executed by other virtual machines or with computing resources provided by the cluster, can be considered. Based on these, and other, considerations, virtual machines implemented in a cluster are configured to operate effectively in the cluster. Configuring a virtual machine can involve allocating and assigning space in a storage device or array, configuring network access, assigning failover targets, and the like. Similarly, applications executed by the virtual machine are configured to effectively operate in the cluster. For example, a database program run by one virtual machine may depend on a web interface program run by another virtual machine. Therefore, the database program is configured to be able to locate and communicate with the virtual machine and/or node where the web interface program is implemented.

Occasionally, a virtual machine is migrated from one node (a source node) to another node (a target node). Such a migration can affect the configuration of the virtual machine and any applications being executed by the virtual machine. For example, if a virtual machine is migrated to a target node that is not configured to access the storage space previously allocated for the virtual machine, the virtual machine can request a new allocation of storage space, e.g., in a different storage device that the target node is configured to access. Once the storage space is allocated, the virtual machine configuration is updated such that the virtual machine can access the storage space.

Migration can compel updating a virtual machine's configuration information. In certain scenarios, even if a configuration update is not compulsory, it may be advantageous. For example, if a target node is located in separate site than the source node, it may be beneficial to update virtual machine configuration information to reflect changes as a result of the inter-site migration. A site is typically a group of computing resources that includes one or more physical nodes and is geographically remote from other sites. Clusters can span multiple sites. Problems can arise if a target node is located in a remote site from a source node. For example, the performance of the virtual machine and/or applications executing on the virtual machine may be degraded as a result of the inter-site migration. These problems can be exacerbated if the virtual machine is not aware that the virtual machine has been migrated to a remote site.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Embodiments described herein provide for detecting and reacting to virtual machine migrations. This involves ensuring that after a virtual machine has been migrated from one host to another host, both the virtual machine and any applications executing on the virtual machine are configured based on the site in which the virtual machine is implemented after the migration.

Occasionally, the occurrence of an event or some other circumstance indicates that a virtual machine should be migrated from one host to another host. For example, the load on a node hosting the virtual machine may exceed a specified threshold, or a maintenance schedule may indicate that the node is to be brought offline, or a failure can occur in hardware and/or software associated with the node, or any other such event may take place. In response to a virtual machine's host being affected by such an occurrence, the virtual machine can be migrated to a different host. A virtual machine can also be migrated based, for example, on usage patterns of the virtual machine, of the virtual machine's host, or of another host to which the virtual machine can be migrated. For example, if a significant number of operations, such as data processing requests that involve a virtual machine at a first location are received from or directed to a different location, e.g., site or node, the virtual machine may be migrated to that location.

In response to detecting that a virtual machine is to be migrated from its current host (source), a new host (target) is selected. The target is either located in the same site as the source, or in a different site from the source. If the target is in a different site, operations that involve the virtual machine may experience performance degradation. This can be the result of the virtual machine being configured to perform optimally in the site in which the virtual machine was migrated from (the source site). For example, the virtual machine can be configured to write data to a particular storage device located in the source site. In this example, if the virtual machine attempts to write to the particular storage device in the source site after the virtual machine has been migrated to a new site (the target site), the writes may take longer, since writes within a site may be faster than writes between sites. In some cases, the writes may even fail, e.g., if the source site does not allow access to the particular storage device by virtual machines in other sites. Other issues can exist related to virtual machine and/or application configuration, such as dependencies between various virtual machines within a site, which can lead to diminished performance if a virtual machine is migrated to a different site.

Problems related to inter-site migration of virtual machines can be alleviated by making the virtual machine aware that the virtual machine has been migrated to a host in a new site and reconfiguring the virtual machine, and any applications running on the virtual machine, to utilize resources in the new site, rather than resources in the site in which the virtual machine was previously implemented. Several ways to notify a migrated virtual machine that it has been migrated to a new site are discussed below. For example, a virtual machine can be notified of a migration by an outside source, or can internally determine that a migration has occurred. Similarly, once a virtual machine has determined that the virtual machine has been migrated, the virtual machine may utilize either external or internal sources to determine whether the migration involved a site change. After the virtual machine determines that the virtual machine has been migrated to a different site, the virtual machine the virtual machine, and/or any applications implemented by the virtual machine, is reconfigured to avoid potential problems that could arise as a result of dependencies to resources associated with the previous site.

Figure 1:
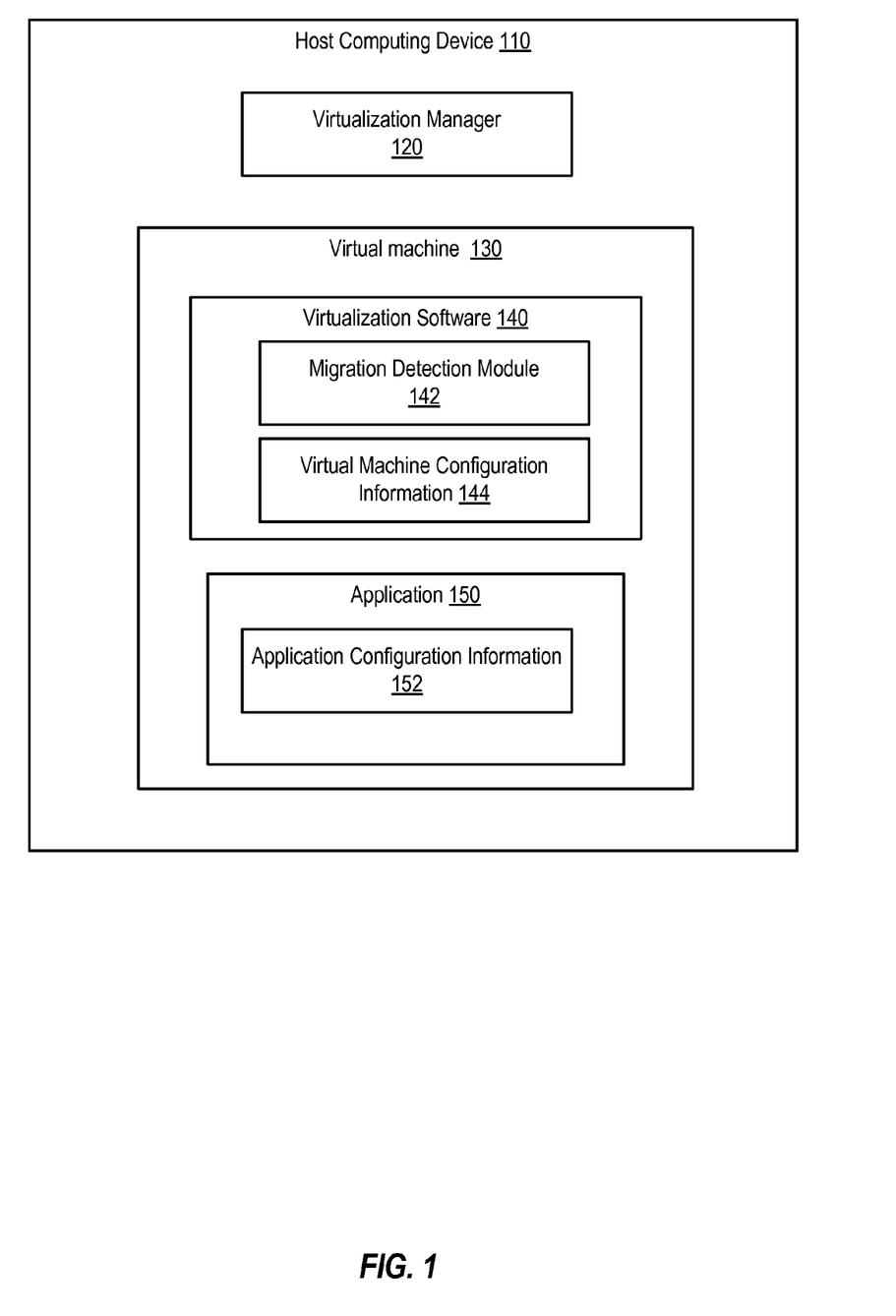
FIG. 1 is a block diagram of a computing device implementing a virtual machine configured to determine a site change, according to one embodiment of the present invention.

FIG. 1 is a block diagram of a host computing device 110. Host computing device 110 is configured to automatically detect when virtual machine 130 is migrated from a first site to a second site and to notify virtual machine 130 of the migration. In response to virtual machine 130 being notified that virtual machine 130 has been migrated to the second site, virtual machine 130 can be reconfigured to avoid performance degradation resulting from being configured for operation in the first site.

Host computing device 110 is configured to host one or more virtual machines, such as virtual machine 130. While FIG. 1 shows only a single virtual machine, it is understood that multiple virtual machines can be implemented on host computing device 110. The host and virtual machine of FIG. 1 are configured to enable the virtual machine to detect a site change and perform configuration changes to the virtual machine and/or one or more applications executing on the virtual machine in response to the site change. As a result of the configuration changes, performance degradation that may otherwise result from the site change is avoided.

Host computing device 110 can be implemented as a physical computing device such as a personal computer, laptop computer, server, personal digital assistant, cell phone, and the like. Host computing device 110 implements a host operating system (not shown). The host operating system is configured to provide one or more virtual machines implemented on host computing device 110 with access to various computing resources, such as processing power, storage space, and connectivity to other devices, e.g., communications with other host computing devices over a network connection.

Host computing device 110 implements a virtualization manager 120. Virtualization manager 120 is configured to perform operations related to creation and management of virtual machines and resources for virtual machines. Virtualization manager 120 provides host computing device 110 the ability to concurrently support one or more virtual machines, such as virtual machine 130. Virtualization manager 120 provides this ability by coordinating the distribution of computer resources (e.g., processing power, memory, etc.) to the virtual machines so that the virtual machines operate similarly to physical computers. Virtualization manager 120 can be designed to support virtual machines by coordinating processor resources to support the execution of instructions on behalf of the virtual machines, and performing memory management to help ensure that the virtual machines effectively share the host computer's system memory as well as external or shared storage space. In one embodiment, virtualization manager 120 is implemented as a hypervisor.

Virtualization manager 120 is configured to detect that a virtual machine is booted on host computing device 110, and to determine whether the virtual machine is being booted for the first time, or if the virtual machine has been migrated from another host computing device. For example, virtualization manager 120 is configured to receive a request to boot a virtual machine. In response to the request, virtualization manager 120 is configured to boot the virtual machine on host computing device 110. Virtualization manager 120 is configured to query the virtual machine to access configuration information regarding the virtual machine, such as whether this is the first time the virtual machine has booted, or whether the virtual machine was previously running on another host. If the virtual machine was previously running on another host, the virtualization manager is configured to determine which host, e.g., by parsing the virtual machine's configuration information to identify a host name or address. In one embodiment, virtualization manager 120 is configured to directly read virtual machine configuration information. In another embodiment, virtualization manager 120 transmits a message to the virtual machine and the virtual machine responds to the message. The configuration information can identify which applications are implemented by the virtual machine 130, what hardware and/or software resources the virtual machine utilizes, and the like. In one embodiment, the configuration information includes state information, such as the name of a host the virtual machine was previously implemented on, a network address for the host, site information for the host, and the like.

In addition to receiving information from the virtual machine, virtualization manager 120 is configured to send information to the virtual machine. In one embodiment, the virtualization manager is configured to communicate information to and from the virtual machine using a management channel. Virtualization manager 120 is configured to send messages to the virtual machine that include configuration information regarding host computing device 110 and/or site information regarding a site in which host computing device is implemented. In one embodiment, virtualization manager 120 is configured to provide the virtual machine with an event. In response to detecting the event, the virtual machine is configured to detect information regarding the virtual machine's environment (e.g., host computing device and site parameters) and update the virtual machine's configuration information.

Virtualization manager 120 is configured to provide an event through the above channel or any such channels to the virtual machine. The event can include information identifying host computing device 110 as the current physical frame on which guest is hosted, whether the virtual machine is migrated from another host computing device or is being started for the first time. The virtualization manager can also provide the virtual machine with information identifying any other changes to attributes of the host computing device. This information can be presented to the virtual machine as special call-back function. Using this event, the virtual machine can detect changes to its configuration, such as the name of host computing device 110, cluster information, and the like. In response to detecting the changes, the virtual machine can initiate changes to configuration information managed by the virtual machine and/or applications executed by the virtual machine.

Multiple levels of cluster abstraction are possible. For each level of cluster abstraction, configuration information regarding the cluster and its components is maintained by management entities associated with the level. One level of cluster abstraction is node level, which pertains to a cluster of nodes. Node-level cluster information indicates what actions should be taken regarding a virtual machine if the node hosting the virtual machine goes down. This information specifies, for example, which node the virtual machine should be migrated to in response to a failure. Another level of abstraction is virtual machine level, which pertains to a cluster of virtual machines. This information specifies, for example, what actions should be taken to ensure high-availability for various resources running on the virtual machines in the virtual machine cluster. For example, if an application fails on one virtual machine, e.g., due to the virtual machine having insufficient resources, the information indicates to where (which virtual machine) the application should be failed over. A virtual machine migration that involves a site change can affect both of these levels of cluster abstraction. Virtual machine 130, and applications executing on virtual machine 130, such as application 150, are configured to update configuration information at one or both levels in response to detecting a site change.

To handle configuration changes at a virtual machine level, virtualization software, such as virtualization software 140, running inside a virtual machine, such as virtual machine 130, can trap an event that indicates that that the virtual machine is being started and determine whether there is a host change. The event can be used as trigger to initiate rediscovery of the site in which the virtual machine's host is located. If the virtual machine discovers that the virtual machine is running in a different site than the site the virtual machine was previously running in, virtualization software 140 can update configuration information for the virtual machine and/or applications running on or associated with the virtual machine. Post-migration, if an application faults on another virtual machine located in the previous site, and the application is to be failed over to the migrated virtual machine, virtualization software on the virtual machine hosting the application will ensure that the application is not failed over to the migrated virtual machine since the migrated virtual machine is no longer present in the previous site. If no virtual machines are available in the previous site and the application is to be failed over to a virtual machine in the new site, measures can be implemented to attempt to ameliorate any effects resulting from inter-site operations, such as implementing policies for handling stretched clusters, and taking appropriate actions to make sure replication directions, and the like, are handled.

In response to determining that a virtual machine is migrated from one host computing device to another host computing device in a different site, virtualization software in virtual machines in the previous site that were clustered with the migrated virtual machine are configured to initiate policies related to site-affinity for the components, such as applications, included in the respective virtual machines.

Virtualization software 140 is configured to communicate with virtualization manager 120, as well as with other virtual machines. Virtualization software 140 is configured to send configuration information to virtualization manager 120, as well as receive configuration information from virtualization manager 120. In one embodiment, virtualization software 120 also processes data access requests for the virtual machine and one or more applications implemented by the virtual machine.

Virtualization software 140 includes a migration detection module 142. In one embodiment, migration detection module 142 is configured to enable virtual machine 130 to detect when virtual machine 130 is migrated from one host, such as host computing device 110, to another host computing device, not shown. In response to detecting the migration, migration detection module 142 is configured to initiate discovery of whether the migration was within a single site or was between sites. In one embodiment, migration detection module 142 receives an event, e.g., from virtualization manager 120. Migration detection module 142 is configured to send out queries in response to an occurrence of a threshold condition, e.g., regularly in response to detecting the expiration of specified time period. Migration detection module 142 is configured to query virtualization manager 120. In response to detecting that a migration has occurred which involved moving the virtual machine from one site to another, migration detection module 142 indicates to virtualization software 140 that virtual machine 130 has changed sites. In response, virtualization software 140 determines what, if any, configuration changes are indicated due to the site change. For example, configuration for the virtual machine can be updated as can configuration for any applications implemented by the virtual machine.

Virtualization software 140 also includes virtual machine configuration information 144. Virtual machine configuration information 144 includes state information about the virtual machine, such as whether the virtual machine is executing normally, the location in which the virtual machine is running, and the like. Virtualization machine configuration information 144 can also include policy information, such as dependencies between the virtual machine 130 and other virtual machines, failover information, and the like.

Virtual machine 130 also includes an application 150. Application 150 can be a word processing program, email program, graphic editing program, database application, or the like. In one embodiment, multiple instances of application 150 are run on multiple virtual machines and/or nodes of a cluster. If host computing device 110 crashes, or otherwise becomes unable to execute application 150, application 150 can be restarted, e.g., failed over, on another node. If virtual machine 130 crashes, or otherwise becomes unable to execute application 150, application 150 can be restarted, e.g., failed over, on another virtual machine. If virtual machine 130 is migrated to another node, application 150 is migrated along with virtual machine 130. When virtual machine 130 is booted on the new node, application 150 is also booted. Application 150 can be impacted by the migration. For example, if application 150 interacts with other applications, e.g., on other virtual machines, such interactions may be affected by the migration.

Application 150 includes application configuration information 152. In one embodiment, application configuration information 152 includes site affinity information, failover policy information, and the like. For example, if application 150 fails on virtual machine 130, application configuration information 152 can include information identifying whether application 150 should be restarted on virtual machine 130, and/or which alternative virtual machine application 150 should be restarted on. In response to virtual machine 130 detecting that virtual machine 130 has migrated to a different site, virtual machine 130 is configured to notify application 150 of the new site. In response to receiving the notification, application 150 is configured to update application configuration information 152. The updating can involve, for example, changing one or more failover targets, changing which instances of other applications application 150 should interact with, specifying the location of the instances, and the like.

Figure 2:
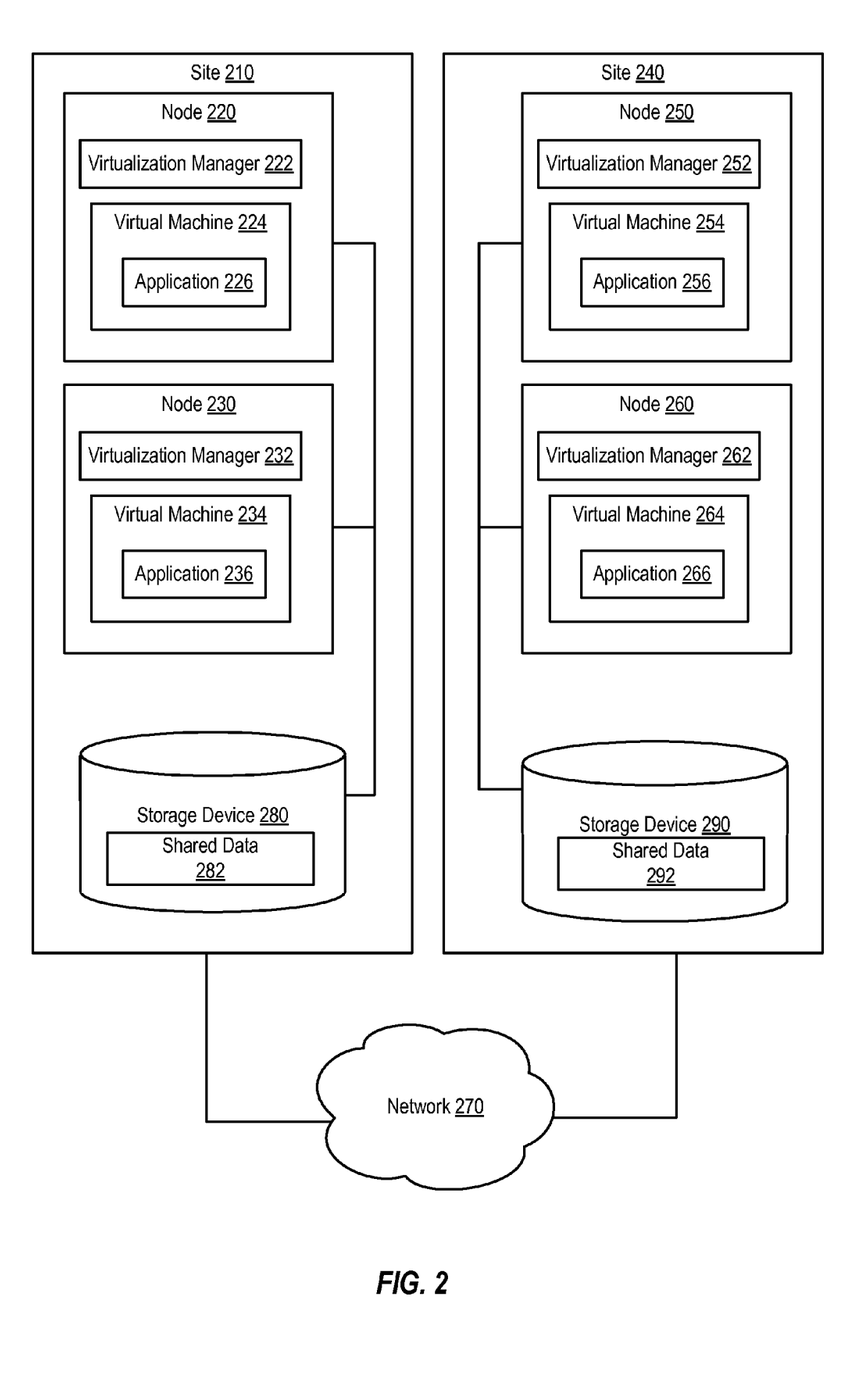
FIG. 2 is a block diagram of a system that includes virtual machines implemented on multiple sites, according to one embodiment of the present invention.

FIG. 2 is a block diagram depicting multiple sites that are each configured to implement one or more virtual machines. A site typically refers to a single physical or geographic location. For example, the elements of site 210 can be located in a single building or campus. Communication within a site is generally performed using high-speed connections within or between nodes. Physical proximity allows for relatively fast network connections between nodes in the same site. Communication between sites is typically not as fast as communication within a site. Inter-site communication generally involves more complex switching and routing problems as well as additional bandwidth considerations. The type of link available between sites is another factor that can cause relatively slow rates of communication between sites as compared to communication within a site. In one embodiment, a site is implemented as a datacenter. Each node within a site can include a value for a site variable that indicates the same site. In one embodiment, a node's address includes a value for the site in which the node is located and the value is identical for all nodes included in the site.

While FIG. 2 is shown as including two sites, it is understood that more sites may be included. Each site includes both processing resources and storage resources. For example, site 210 includes processing resources node 220 and node 230. Site 210 also includes storage resources, such as storage device 280. The storage and processing resources implemented in a site are communicatively coupled.

In one embodiment, site 210 is implemented in a first geographical location while site 240 is implemented in a second geographical location. The sites are communicatively coupled via a network, such as network 270. Network 270 can include a WAN (Wide Area Network), such as the Internet, one or more LANs (Local Area Networks), and/or one or more SANs (Storage Area Networks). The transfer of data within a site is, in one embodiment, performed using relatively high-speed data transmission mechanisms, as compared with communications between sites, or between an entity within the site and entities outside the site.

As shown in FIG. 2, site 210 includes a plurality of nodes, including node 220 and node 230. While site 210 is shown as including two nodes, it is understood that more or fewer nodes can be implemented in site 210. Similar to the description of FIG. 1, node 220 implements a virtualization manager 222 and a virtual machine 224, which implements an application 226. Node 230 implements a virtualization manager 232 and virtual machine 234, which implements an application 236.

Storage device 280 provides persistent data storage, such that data stored on storage device 280 will remain stored even after the storage device is powered off. Storage device 280 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Storage device 280 can also be a virtual or logical storage device that is implemented on such physical storage devices and/or storage systems. For example, storage device 280 can be a logical volume that is implemented on a RAID storage system. Additionally, storage device 280 can include one or more storage devices. Storage device 280 can also include one or more types of storage media, including solid state media (e.g., flash drives), optical media (e.g., CDs and DVDs), and magnetic media (e.g., hard disks or magnetic tape). In some embodiments, storage device 280 can be implemented using cloud storage, in which the storage device is a logical storage device to which physical storage device(s) are allocated on an as-needed and/or as-contracted basis.

As shown, storage device 280 includes shared data 282. Applications implemented by the virtual machines, and the virtual machines themselves, are configured to access, e.g., by reading data from and writing data to, shared data 282.

FIG. 2 also depicts a site 240, which implements a plurality of sites, including nodes 250 and 260. Node 250 implements a virtualization manager 252 and a virtual machine 254. Virtual machine 254 implements an application 256. Node 260 implements a virtualization manager 262 and a virtual machine 264. Virtual machine 264 implements an application 266. Also implemented in site 240 is a storage device 290, which includes shared data 292. The elements of site 240 are similar to corresponding elements of site 210, and description of these elements is omitted.

Figure 3:
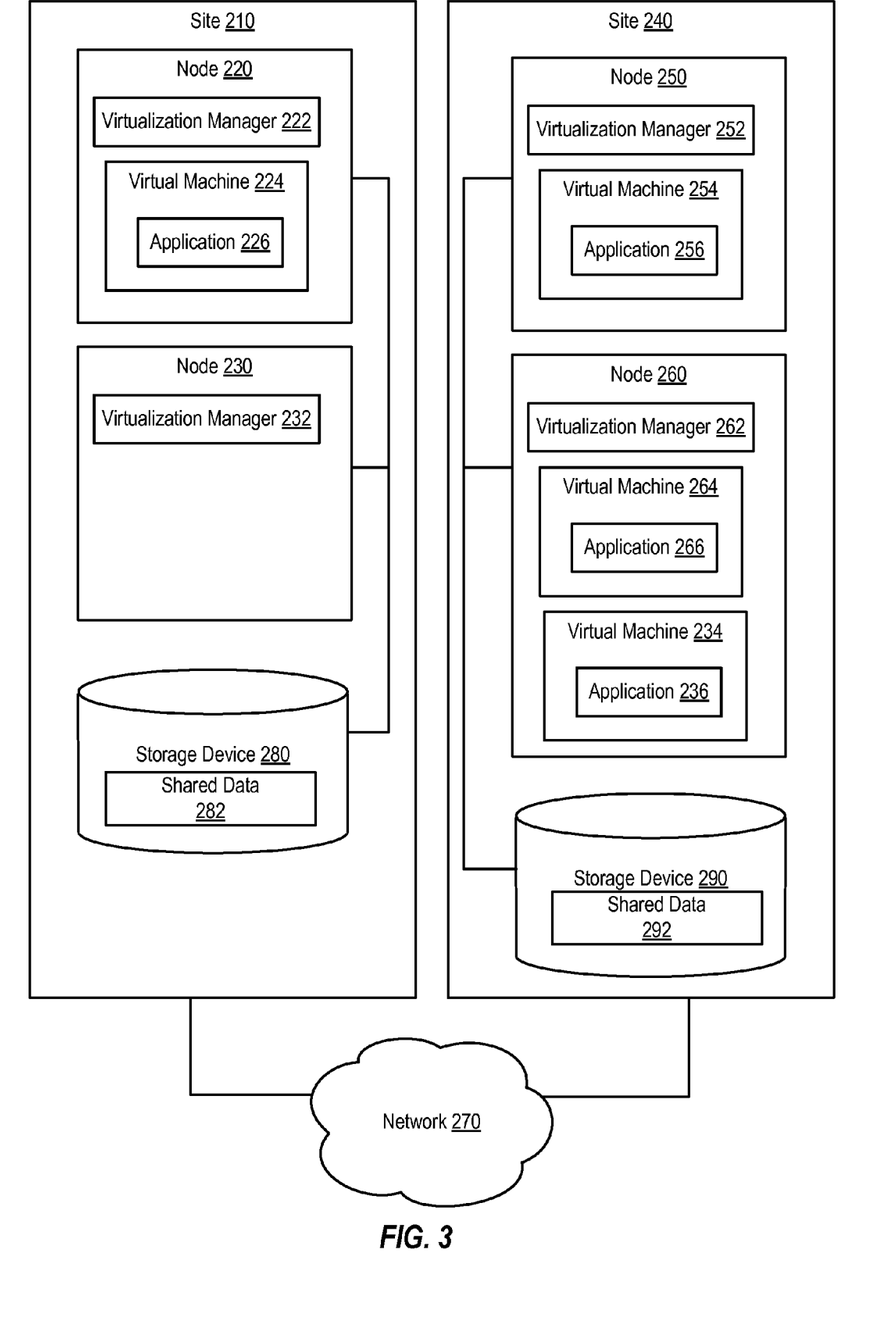
FIG. 3 is a block diagram of a system that depicts a virtual machine having migrated from one site to another site, according to one embodiment of the present invention.

FIG. 3 includes many of the same elements depicted in FIG. 2, and like elements are depicted by like figure numbers. In FIG. 3, virtual machine 234 has migrated from site 210 to site 240. In one embodiment, a migration involves shutting down a virtual machine that is implemented on a first host (source). In one embodiment, this involves completing any ongoing operations, such as I/O operations, and preventing the virtual machine from initiating any further operations. Once all operations are complete, the virtual machine, and/or application(s) executing on the virtual machine, saves state and configuration information the virtual machine is brought offline. The virtual machine, e.g., data that comprises the virtual machine, is then copied to a different host (target) and is stored in storage space allocated to the target. This can be on the target or in shared storage. The virtual machine is then booted, e.g., by a virtualization manager implemented on the target. Various operations may be performed automatically in accordance with configuration information in the virtualization manager, virtual machine configuration information, and/or application configuration information. For example, the virtualization manager can verify that the virtual machine has storage space allocated and network connectivity. In one embodiment, the virtualization manager accesses virtual machine configuration information to perform these tasks.

Migration can be initiated manually, e.g., by an administrator. Alternatively, migration can be initiated automatically in response to detecting a specified condition, e.g., load or access characteristic of a host. As a result of migrating virtual machine 234 from one site to another, that is from node 230 in site 210 to node 260 in site 240, it may be beneficial to update configuration information used in operations related to virtual machine 234. For example, if application 226 was configured such that in the event of a failover, application 226 was to failover to virtual machine 234, such a failover would now be across sites, so application 226 can be reconfigured to instead failover to another virtual machine in site 210 (not shown). Virtual machine 234 was likely configured to utilize storage device 280. In response to being migrated to a new site, virtual machine 234 and any applications implemented thereon, e.g., application 236, can be reconfigured, e.g., by virtualization manager 262, to instead utilize storage device 290. Also, virtual machine 234 and/or applications implemented thereon, such as application 236, can be reconfigured to failover to virtual machines and/or nodes within site 240, rather than failover to site 210.

Figure 4:
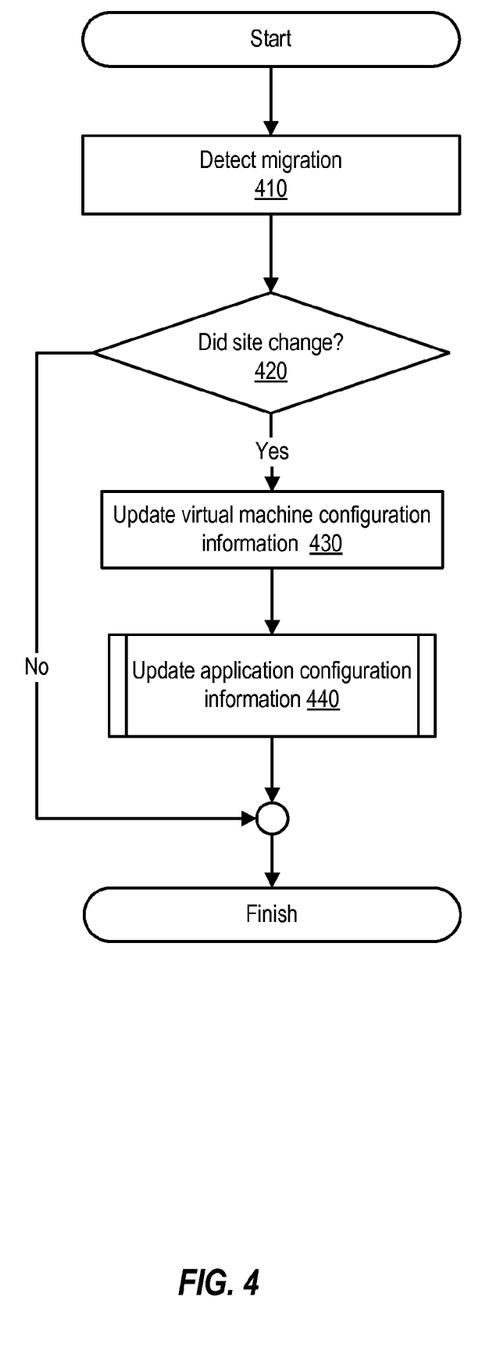
FIG. 4 is a flowchart illustrating a method of migrating a virtual machine from one site to another site, according to one embodiment of the present invention.

FIG. 4 is a flowchart illustrating a method of detecting and reacting to migration of a virtual machine from one site to another site. In one embodiment, the method is performed by a migration detection module implemented by a virtual machine, such as migration detection manager 142 of virtual machine 140, as shown in FIG. 1.

At 410, the migration detection module detects that the virtual machine has been migrated. The migration detection module can detect that a migration has occurred in a number of ways. In one embodiment, the migration detection module receives notice that the virtual machine has been migrated from an external (to the virtual machine) source. The external source can be, for example, a virtualization manager implemented by a host node, such as virtualization manager 120 on host computing device 110 of FIG. 1. The virtualization manager detects that the virtual machine has been started on the host node that implements the virtualization manager. The virtualization manager detects whether the virtual machine has been migrated. In one embodiment, the virtualization manager detects that data used to implement the virtual machine is copied to the host node. The virtualization manager accesses configuration information within the data. The configuration information indicates whether the virtual machine was previously implemented on a node. If the configuration information indicates that the virtual machine was previously implemented on another node, then the virtualization manager concludes that the virtual machine has been migrated. The virtualization manager is configured to notify the virtual machine of the migration. The notification can be transmitted by the virtualization manager to the virtual machine through a control domain management channel, or any other available means. For example, the virtualization manager can transmit an event to the virtual machine which the virtual machine responds to with a query. In one embodiment, the virtualization manager sends a message to the virtual machine.

In another embodiment, the migration detection module detects a migration based on internal information. For example, the migration detection module detects an event, such as a startup notice. In response to detecting the event, the migration detection module is configured to determine whether a migration has occurred. For example, the migration detection module can determine if the virtual machine was previously implemented on another node and is being booted on the current node for the first time. If so, the migration detection module can determine that a migration has occurred.

After the migration detection module is made aware of a migration, at 410, the migration detection module determines, at 420, whether the migration involved a site change, or was within a single site. In the embodiment where the virtualization manager notified the virtual machine of the migration, the virtualization manager can include information identifying the new site. The migration detection module can compare that information with previously stored information identifying the site. If the two do not match, the virtualization manager determines that there has been a site change.

In the embodiment where the migration detection module detects migration internally, the migration detection module is configured to determine the current site and compare the current site with previously stored site information in response to detecting the migration. The migration detection module is configured to query the host node, e.g., via a virtualization manager, to determine the site in which the host node is implemented.

In one embodiment, determining whether the site changed involves comparing state information stored in virtual machine configuration information with the new site information. If the site did not change, the method ends. Otherwise, the migration detection module updates virtual machine configuration information, at 430. In one embodiment, this involves writing information and identifying the site in which the virtual is running to a table, or database of information. Updating virtual machine configuration information can involve identifying one or more resources that can be used to comply with policies implemented using virtual machine configuration information. For example, the virtual machine can discover and select available failover targets, network connections, storage resources, and the like.

At 440, the migration detection module initiates an update of application configuration, such as application configuration information 152 of FIG. 1. In one embodiment, this step is not performed. For example, if no applications are executing on the virtual machine which includes site affinity and the virtual machine itself does not have any dependencies affected by site, this step maybe skipped. Otherwise, the migration detection module initiates updated application configuration information, as discussed in greater detail with regard to FIG. 5.

Figure 5:
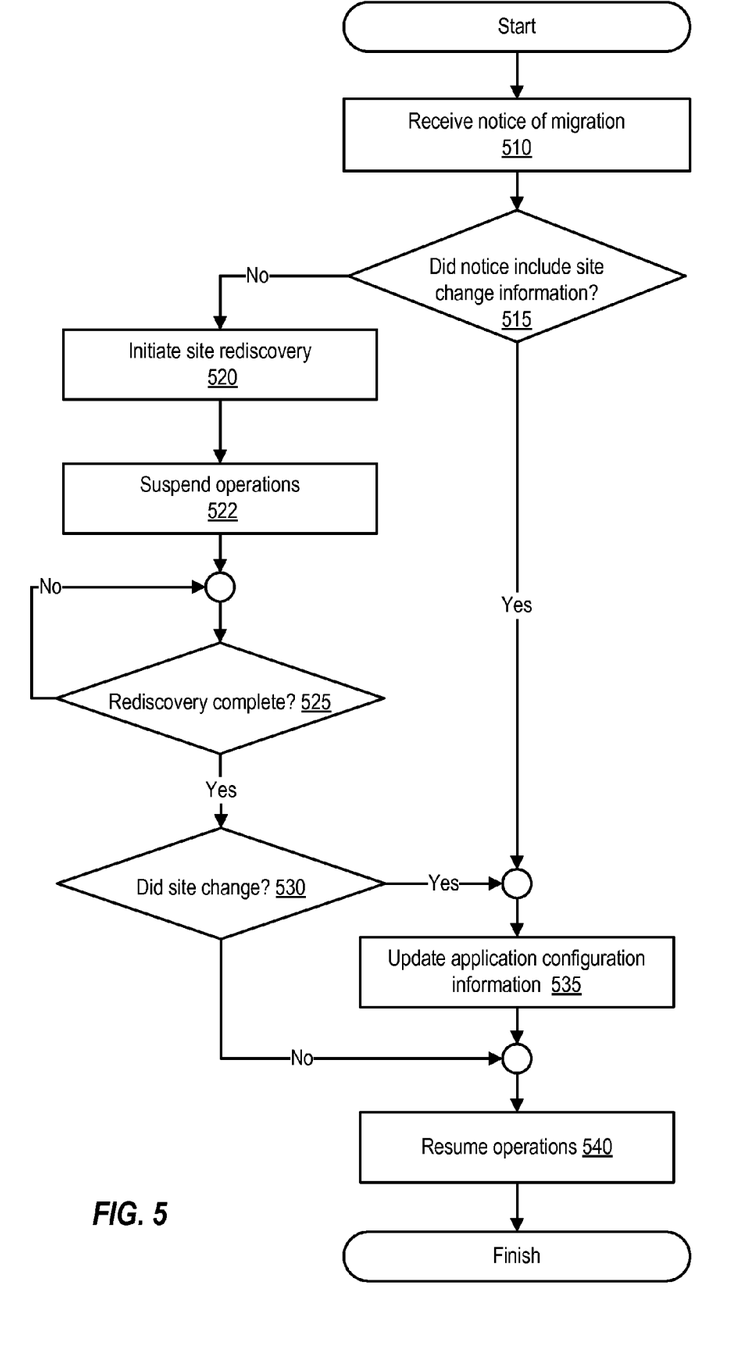
FIG. 5 is a flowchart illustrating additional details of a method of migrating a virtual machine from one site to another site, according to one embodiment of the present invention.

FIG. 5 is a flowchart illustrating additional details of a method of migrating a virtual machine between sites. In one embodiment, the method is performed by one or more applications executing on a virtual machine, such as application 150 of FIG. 1.

At 510, the application receives a notice of migration. In one embodiment, the notice is received from a migration detection module, such as migration detection manager 142 of FIG. 1. The notice can include information identifying a new site.

The application determines, at 515, whether the notice included site change information. If so, at 535 the application updates application configuration information, such as application configuration information 152 of FIG. 1, to reflect the new site. Updates to application configuration information can include failover targets, storage resources, application dependency information, and the like.

If no site change information was included in the notice, the application initiates a site rediscovery at 520. In one embodiment, this involves querying the virtual machine and/or one or more applications or resources associated with the virtual machine to determine the new site.

At 522, the application suspends operations, such as input/output operations, while the site rediscovery is ongoing. Doing so can prevent inefficient use of resources and/or failures resulting from using stale configuration information. In one embodiment, the virtual machine suspends operations and notifies the application of the suspension.

The application determines, at 525, whether site rediscovery is complete. In one embodiment, this involves the application receiving a notice from the virtual machine or checking the value of a flag configured to indicate whether site rediscovery is ongoing.

Once the site rediscovery is complete, the application determines, at 530, whether there has been a site change. In one embodiment, the application receives information identifying the current site, e.g., in response to a query sent by the applications. The application compares the current site with site information stored in application configuration information. If the information does not match, there has been a site change, and the application updates application configuration operation at 535. Otherwise, the application does not update the application configuration information.

At 540, the application resumes operations, if they were previously suspended. In one embodiment, this involves clearing a suspend flag and resuming I/O operations.

Figure 6:
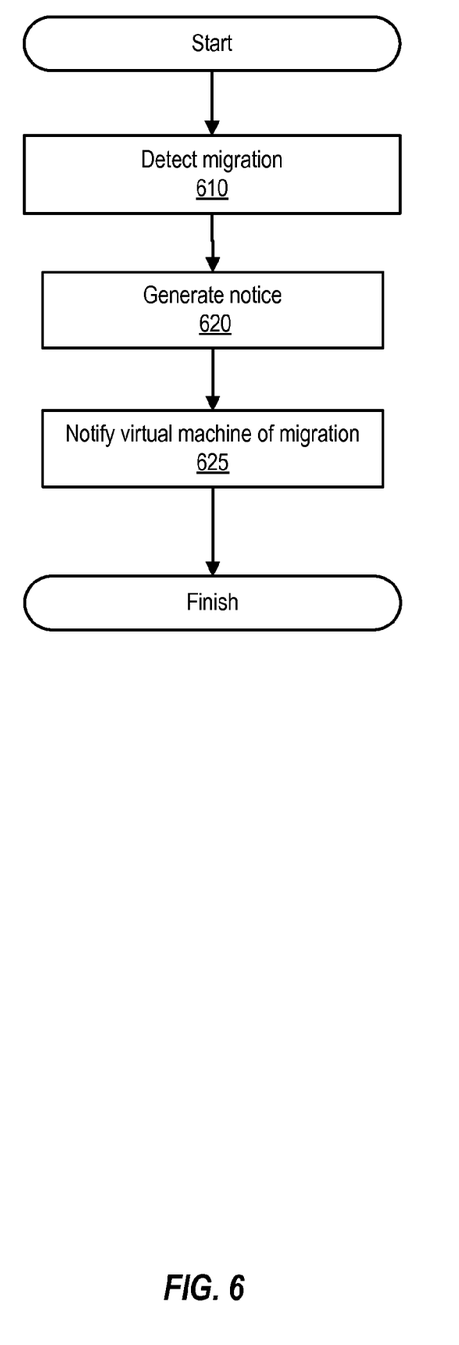
FIG. 6 is a flowchart illustrating additional details of a method of migrating a virtual machine from one site to another site, according to one embodiment of the present invention.

FIG. 6 is a flowchart illustrating additional details of a method of migrating a virtual machine from one site to another site. In one embodiment, the method is performed by a virtualization manager, such as virtualization manager 120 of FIG. 1.

At 610, the virtualization manager detects that a virtual machine has been migrated. In one embodiment, the virtualization manager is notified, e.g., by a host that implements the virtualization manager, such as host computing device 110 of FIG. 1, that a virtual machine is being booted on the host. The virtualization manager determines if the virtual machine is migrated, and if so, if the migration is from another site.

The virtualization manager generates, at 620, a notice of the migration. In one embodiment, the notice includes information indicating the new site to which the virtual machine has been migrated.

At 625, the virtualization manager notifies the virtual machine of the migration. In one embodiment, the virtualization manager provides an event to the virtual machine.

Figure 7:
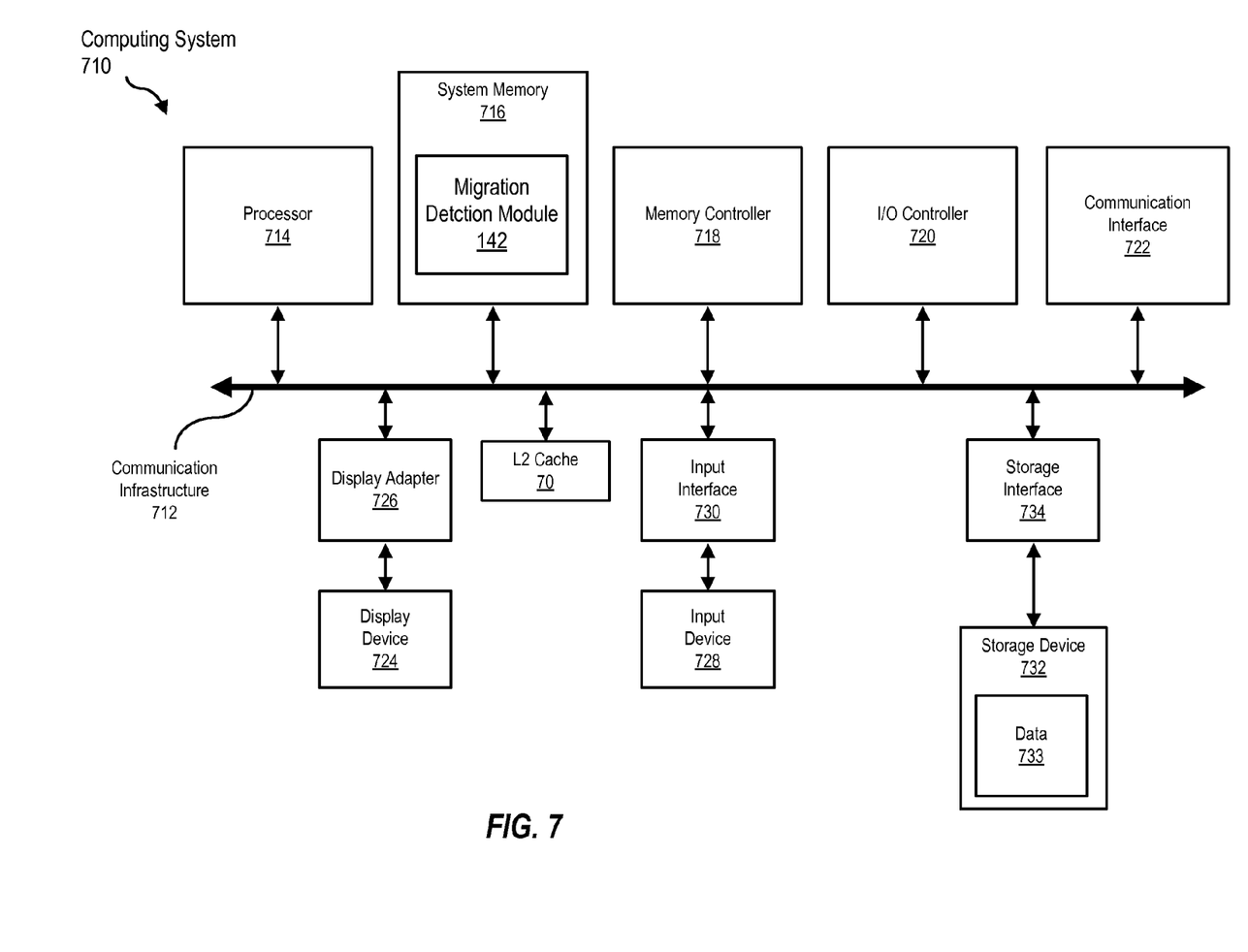
FIG. 7 is a block diagram of a computing device, illustrating how a migration module can be implemented in software, according to one embodiment of the present invention.

FIG. 7 is a block diagram of a computing device, illustrating how a migration detection module can be implemented in software, as described above. Computing system 710 broadly represents any single or multi-processor computing device or system capable of executing computer-readable instructions. Examples of computing system 710 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 710 may include at least one processor 714 and a system memory 716. By executing the software that implements a migration detection module 142, computing system 710 becomes a special purpose computing device that is configured to detect inter-site migration operations of virtual machines and inform and update the virtual machines of the inter-site migration operations, in the manner described above.

Processor 714 generally represents any type or form of processing unit capable of processing data or interpreting and executing instructions. In certain embodiments, processor 714 may receive instructions from a software application or module. These instructions may cause processor 714 to perform the functions of one or more of the embodiments described and/or illustrated herein. For example, processor 714 may perform and/or be a means for performing the operations described herein. Processor 714 may also perform and/or be a means for performing any other operations, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, storage device 733, as described in detail below). In one example, program instructions executable to implement a migration detection module (e.g., as shown in FIG. 1) may be loaded into system memory 716.

In certain embodiments, computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the operations or features described and/or illustrated herein.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer) for display on display device 724.

As illustrated in FIG. 7, computing system 710 may also include at least one input device 728 coupled to communication infrastructure 712 via an input interface 730. Input device 728 generally represents any type or form of input device capable of providing input, either computer or human generated, to computing system 710. Examples of input device 728 include, without limitation, a keyboard, a pointing device, a speech recognition device, or any other input device.

As illustrated in FIG. 7, computing system 710 may also include a storage device 732 coupled to communication infrastructure 712 via a storage interface 734. Storage device 732 generally represents any type or form of storage device or medium capable of storing data and/or other computer-readable instructions. For example, storage device 732 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage device 732 and other components of computing system 710. A storage device like storage device 732 can store information such as full backup images, incremental backup images, and/or backup metadata, e.g., in data 733.

In certain embodiments, storage device 732 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 732 may also include other similar structures or devices for allowing computer software, data, or other computer-readable instructions to be loaded into computing system 710. For example, storage device 732 may be configured to read and write software, data, or other computer-readable information. Storage device 732 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7.

Computing system 710 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 710 for storage in memory via a network such as the Internet or upon a carrier medium.

The computer-readable medium containing the computer program may be loaded into computing system 710. All or a portion of the computer program stored on the computer-readable medium may then be stored in system memory 716 and/or various portions of storage device 732. When executed by processor 714, a computer program loaded into computing system 710 may cause processor 714 to perform and/or be a means for performing the functions of one or more of the embodiments described and/or illustrated herein. Additionally or alternatively, one or more of the embodiments described and/or illustrated herein may be implemented in firmware and/or hardware. For example, computing system 710 may be configured as an application specific integrated circuit (ASIC) adapted to implement one or more of the embodiments disclosed herein.

Figure 8:
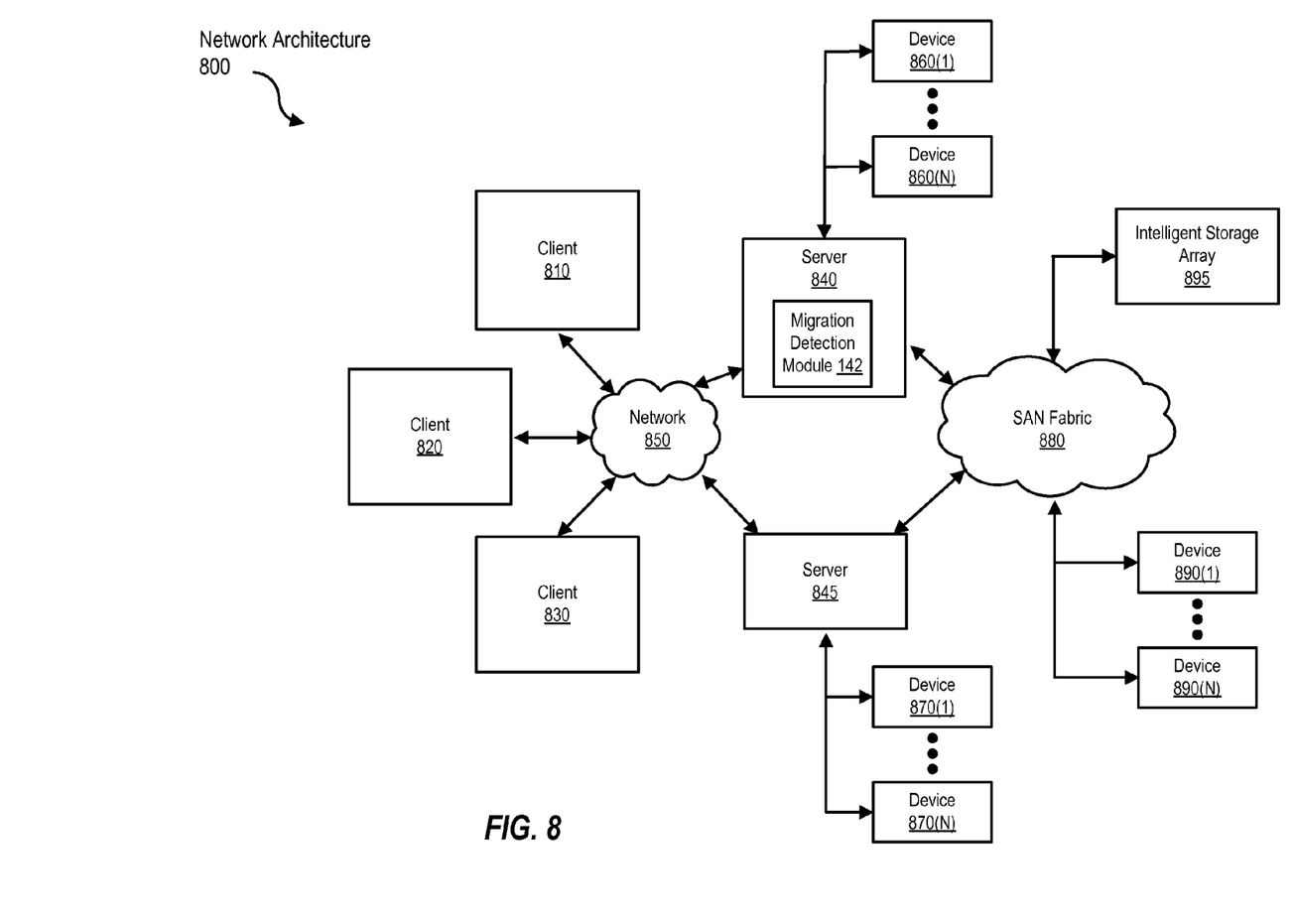
FIG. 8 is a block diagram of a networked system, illustrating how various computing devices can communicate via a network, according to one embodiment of the present invention.

FIG. 8 is a block diagram of a network architecture 800 in which client systems 810, 820, and 830 and servers 840 and 845 may be coupled to a network 850. Client systems 810, 820, and 830 generally represent any type or form of computing device or system, such as computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, one or more of client systems 810, 820, and/or 830 may include a restore module 144 as shown in FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as Network File System (NFS), Server Message Block (SMB), or Common Internet File System (CIFS). Such storage devices can store backup information and storage configuration information, as described above.

Servers 840 and 845 may also be connected to a storage area network (SAN) fabric 880. SAN fabric 880 generally represents any type or form of computer network or architecture capable of facilitating communication between multiple storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 840, server 845, storage devices 840(1)-(N), storage devices 870(1)-(N), storage devices 890(1)-(N), intelligent storage array 895, or any combination thereof. All or a portion of one or more of the embodiments disclosed herein may also be encoded as a computer program, stored in server 840, run by server 845, and distributed to client systems 810, 820, and 830 over network 850.

In some examples, all or a portion of one of the systems in FIGS. 1, 7, and 8 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a migration detection module may transform the behavior of a host computing device such that virtual machines can be updated in response to detecting inter-site migration.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   receiving, by an application executing on a virtual machine, a first notice that a virtual machine will be potentially migrated;
   determining, by the application, whether or not the first notice of the potential migration indicates that the potential migration moves the virtual machine from a first site to a second site;
   if the application determines the first notice does not indicate the potential migration moves from a first site to a second site,
      initiating, by the application, a site rediscovery process,
      suspending, by the application, I/O operations of the application,
      receiving, by the application, a second notice from the virtual machine that the site rediscovery process is complete, wherein the second notice includes information corresponding to a site that will host the virtual machine, wherein the hosting site is one of a plurality of sites including the first and second sites, and
      determining, by the application based on the second notice, whether the potential migration moves the virtual machine from the first site to the second site by comparing application configuration information stored within the application to the information in the second notice, wherein the application configuration information comprises site affinity information, a failover site, and a storage resource;

migrating the virtual machine from the first site to the second site;

responsive to migrating the virtual machine from the first site to the second site, updating, by the application, the application configuration information to reflect new site affinity information, a new failover site, and a new storage resource, and resuming, by the application, I/O operations at the second site; and responsive to a failure of the virtual machine, resuming execution of the application in a new virtual machine on a different site corresponding to the new failover site in the application configuration information.

2. The computer-implemented method of claim 1, further comprising:

detecting an operation initiated by the application running on the virtual machine, wherein the operation is based on the application configuration information; and preventing the operation from completing while the updating is ongoing.

3. The computer-implemented method of claim 1, further comprising:

accessing site change information;

determining that the migration is not based on the site change information; and based on determining that the migration is not based on the site change information, determining that there has been a site change from the first site that necessitates the site rediscovery process.

4. The computer-implemented method of claim 1, further comprising:

updating the application configuration information at a node level and at a virtual machine level of a cluster.

5. The computer-implemented method of claim 4, wherein the node level is a first level of cluster abstraction of the cluster and the virtual machine level is a second level of cluster abstraction of the cluster, the first level is associated with a node-level cluster information and the second level is associated with a virtual machine-level cluster information, the node-level cluster information indicates one or more actions that should be taken by the virtual machine after a node hosting the virtual machine fails, and the virtual machine-level cluster information indicates one or more other actions that should be taken by the virtual machine to ensure continued operation of the cluster.

6. The computer-implemented method of claim 1, further comprising:

sending one or more attributes of the second site to the virtual machine as a special call-back function, wherein the special call-back function indicates one or more changes to one or more attributes of the second site.

7. The computer-implemented method of claim 1, further comprising:

responsive to the migration of the virtual machine, receiving a confirmation from the virtual machine that indicates that the virtual machine is not configured for operation in the first site.

8. A non-transitory computer readable storage medium storing program instructions executable to:

receive, by an application executing on a virtual machine, a first notice that a virtual machine will be potentially migrated;

determine, by the application, whether or not the first notice of the potential migration indicates that the potential migration moves the virtual machine from a first site to a second site;

if the application determines the first notice does not indicate the potential migration moves from a first site to a second site, initiating, by the application, a site rediscovery process, suspending, by the application, I/O operations of the application, receiving, by the application, a second notice from the virtual machine that the site rediscovery process is complete, wherein the second notice includes information corresponding to a site that will host the virtual machine, wherein the hosting site is one of a plurality of sites including the first and second sites, and determining, by the application based on the second notice, whether the potential migration moves the virtual machine from the first site to the second site by comparing application configuration information stored within the application to the information in the second notice, wherein the application configuration information comprises site affinity information, a failover site, and a storage resource;

migrating the virtual machine from the first site to the second site;

responsive to migrating the virtual machine from the first site to the second site, updating, by the application, the application configuration information to reflect new site affinity information, a new failover site, and a new storage resource, and resuming, by the application, I/O operations at the second site; and responsive to a failure of the virtual machine, resuming execution of the application in a new virtual machine on a different site corresponding to the new failover site in the application configuration information.

9. The non-transitory computer readable storage medium of claim 8, wherein the instructions are further executable to:

detect an operation initiated by the application running on the virtual machine, wherein the operation is based on the application configuration information; and prevent the operation from completing while the updating is ongoing.

10. The non-transitory computer readable storage medium of claim 8, wherein the instructions are further executable to:

access site change information;

determine that the migration is not based on the site change information; and based on determining that the migration is not based on the site change information, determining that there has been a site change from the first site that necessitates the site rediscovery process.

11. The non-transitory computer readable storage medium of claim 8, wherein the instructions are further executable to:

update the application configuration information at a node level and at a virtual machine level of a cluster.

12. The non-transitory computer readable storage medium of claim 11, wherein the node level is a first level of cluster abstraction of the cluster and the virtual machine level is a second level of cluster abstraction of the cluster, the first level is associated with a node-level cluster information and the second level is associated with a virtual machine-level cluster information, the node-level cluster information indicates one or more actions that should be taken by the virtual machine after a node hosting the virtual machine fails, and the virtual machine-level cluster information indicates one or more other actions that should be taken by the virtual machine to ensure continued operation of the cluster.

13. The non-transitory computer readable storage medium of claim 8, wherein the instructions are further executable to:
responsive to the migration of the virtual machine,
receive a confirmation from the virtual machine that indicates that the virtual machine is not configured for operation in the first site.

14. The non-transitory computer readable storage medium of claim 8, wherein the instructions are further executable to:
send one or more attributes of the second site to the virtual machine as a special call-back function, wherein
the special call-back function indicates one or more changes to the one or more attributes of the second site.

15. A system comprising:
one or more processors; and
a memory coupled to the one or more processors, wherein the memory stores program instructions executable by the one or more processors to:
receive, by an application executing on a virtual machine, a first notice that a virtual machine will be potentially migrated;
determine, by the application, whether or not the first notice of the potential migration indicates that the potential migration moves the virtual machine from a first site to a second site;
if the application determines the first notice does not indicate the potential migration moves from a first site to a second site,
initiating, by the application, a site rediscovery process,
suspending, by the application, I/O operations of the application,
receiving, by the application, a second notice from the virtual machine that the site rediscovery process is complete, wherein the second notice includes information corresponding to a site that will host the virtual machine, wherein the hosting site is one of a plurality of sites including the first and second sites, and
determining, by the application based on the second notice, whether the potential migration moves the virtual machine from the first site to the second site by comparing application configuration information stored within the application to the information in the second notice, wherein the application configuration information comprises site affinity information, a failover site, and a storage resource;

migrating the virtual machine from the first site to the second site;
responsive to migrating the virtual machine from the first site to the second site,
updating, by the application, the application configuration information to reflect new site affinity information, a new failover site, and a new storage resource, and
resuming, by the application, I/O operations at the second site; and
responsive to a failure of the virtual machine, resuming execution of the application in a new virtual machine on a different site corresponding to the new failover site in the application configuration information.

16. The system of claim 15, wherein the instructions are further executable to:
detect an operation initiated by the application running on the virtual machine, wherein
the operation is based on the application configuration information; and
prevent the operation from completing while the updating is ongoing.

17. The system of claim 15, further comprising:
accessing site change information;
determining that the migration is not based on the site change information; and
based on determining that the migration is not based on the site change information, determining that there has been a site change from the first site that necessitates the site rediscovery process.

18. The system of claim 15, further comprising:
updating the application configuration information at a node level and at a virtual machine level of a cluster.

19. The system of claim 18, wherein
the node level is a first level of cluster abstraction of the cluster and the virtual machine level is a second level of cluster abstraction of the cluster,
the first level is associated with a node-level cluster information and the second level is associated with a virtual machine-level cluster information,
the node-level cluster information indicates one or more actions that should be taken by the virtual machine after a node hosting the virtual machine fails, and
the virtual machine-level cluster information indicates one or more other actions that should be taken by the virtual machine to ensure continued operation of the cluster.

20. The system of claim 15, further comprising:
responsive to the migration of the virtual machine, receiving a confirmation from the virtual machine that indicates that the virtual machine is not configured for operation in the first site.

21. The system of claim 15, further comprising:
sending one or more attributes of the second site to the virtual machine as a special call-back function, wherein
the special call-back function indicates one or more changes to the one or more attributes of the second site.

* * * * *